(12) United States Patent
Chang et al.

(10) Patent No.: US 8,335,758 B2
(45) Date of Patent: Dec. 18, 2012

(54) DATA ETL METHOD APPLIED TO REAL-TIME DATA ETL SYSTEM

(75) Inventors: Wei Chang, Jiangsu (CN); Zhigang Yu, Jiangsu (CN); Shuquan Liu, Jiangsu (CN); Guoxiang Liu, Jiangsu (CN); Pengcheng Shen, Jiangsu (CN); Qing Lan, Jiangsu (CN); Guozhen Bian, Jiangsu (CN); Feng Zhang, Jiangsu (CN)

(73) Assignee: Linkage Technology Group Co., Ltd., Nanjing, Jiansu (CN)

( * ) Notice: Subject to any disclaimer, the term of this patent is extended or adjusted under 35 U.S.C. 154(b) by 510 days.

(21) Appl. No.: 12/644,871

(22) Filed: Dec. 22, 2009

(65) Prior Publication Data

US 2010/0180088 A1 Jul. 15, 2010

(30) Foreign Application Priority Data

Jan. 9, 2009 (CN) .......................... 2009 1 0028104

(51) Int. Cl.
*G06F 9/46* (2006.01)
*G06F 7/00* (2006.01)
(52) U.S. Cl. ......... 707/602; 718/101; 718/102; 707/600
(58) Field of Classification Search .................. 707/600, 707/602; 718/100, 101, 102
See application file for complete search history.

(56) References Cited

U.S. PATENT DOCUMENTS

| 7,941,397 B2* | 5/2011 | Wilms et al. ................. 707/602 |
| 8,200,614 B2* | 6/2012 | Syed et al. .................... 707/602 |
| 2004/0186915 A1* | 9/2004 | Blaszczak et al. ............ 709/246 |
| 2008/0222634 A1* | 9/2008 | Rustagi ......................... 718/100 |
| 2009/0177671 A1* | 7/2009 | Pellegrini et al. ............. 707/100 |
| 2010/0280990 A1* | 11/2010 | Castellanos et al. .......... 707/602 |

OTHER PUBLICATIONS

Langseth, J. "Real-Time Data Warehousing: Challenges and Solutions", DSSResources.COM, Feb. 8, 2004, Online Link "http://dssresources.com/papers/features/langseth/langseth02082004.html".*

* cited by examiner

*Primary Examiner* — Emerson Puente
*Assistant Examiner* — Willy W Huaracha
(74) *Attorney, Agent, or Firm* — Global IP Services; Tianhua Gu

(57) ABSTRACT

The data ETL (Extraction-Transformation-Loading) dispatching method of the present invention is applied to a real-time data ETL system, wherein a main ETL dispatching engine executes tasks according to preset sequence. In the execution, some key information are memorized by the main ETL dispatching engine, such as lscycle (latest successful data cycle), curcycle (current processing data cycle), and endcycle (processing end data cycle), etc., and are transferred to called programs. After the execution of the called programs, the main ETL dispatching engine records and keeps the updated dispatching information. In the data re-extraction, the data ETL dispatching method is adopted for the automatic re-extraction of some tasks and some cycles therein. The data ETL dispatching method, solves the problem caused by cyclic closed-loop extraction in traditional ETL dispatching programs according to timestamps in the real-time data ETL system, simplifies the tasks of the called program by allowing the called programs to focus on its own business logic, thereby giving sufficient development time for the real-time data ETL field, resulting in greatly enhancing the efficiency of project implementation.

5 Claims, 1 Drawing Sheet

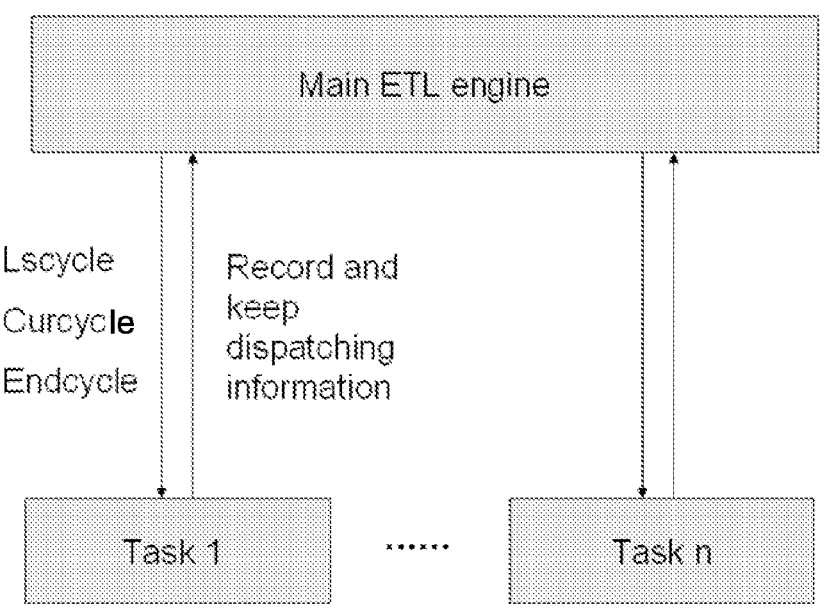

DATA ETL METHOD APPLIED TO REAL-TIME DATA ETL SYSTEM

CROSS REFERENCE TO RELATED PATENT APPLICATION

This application claims the priority of the Chinese patent application No. 200910028104.2 filed on Sep. 1, 2009, which application is incorporated herein by reference.

FIELD OF THE INVENTION

The technical proposal in the invention is applied to the dispatching of real-time data ETL system. Memory dispatching method (state-based dispatching method) is used to solve the problem that the called program in the real-time data ETL system is exhausted to process dispatching information, instead of making the called program focus on its own business logic.

BACKGROUND OF THE INVENTION

ETL (Extraction-Transformation-Loading) just indicates data extraction, transformation and loading. ETL extracts the data (such as relational data and planar data documents, etc.) from distributed and heterogeneous data sources into the interim intermediate layer for cleaning, transformation and integration, finally loads data to data warehouse or data mart used for online analysis. At present, all the existing ETL dispatching methods are non-memory and non-state dispatching methods, such as dispatching at fixed time point (fixed cycle). For example, one program is executed at 11:00 pm every night; there is not any correlation on dispatching layer between two dispatches; the judgment of task state and the selection of time cycle are fully completed automatically by the program logic of the called program which not only increases the burden of the called program, but also makes it be lacking in concentration on its own business logic.

The existing ETL dispatching methods are characterized by the followings:
  Cyclic closed-loop extraction: The present ETL dispatching methods are all non-memory and non-state, and could only solve the ETL extraction at fixed time point (fixed cycle), but without the timestamp extraction (cyclic closed-loop extraction) in the ETL system.
  Data re-extraction: The present ETL dispatching methods could not effectively solve the problem of automatic data re-extraction.
  Acceleration of tasks with dispatching time lagged: If ETL task is suspended or falsely executed for some reason, and lags behind the preset plan; when the task is restored to the normal operation, it's unavailable to automatically accelerate the ETL task according to the characteristics of time cycle.
  Self-assessment: The present ETL dispatching program could not carry out self-assessment according to the characteristics of ETL.

SUMMARY OF THE INVENTION

The invention is to solve the problems in traditional ETL dispatching methods. To adopt memory and state-based dispatching method, dispatching engine could memorize the time cycle, state and duration of each task in each operation, which optimizes the dispatching strategies and enhances the performance on dispatching layer. As a result, the called program focuses more on its own business logic, and finally solve the problems such as the cyclic closed-loop extraction, data re-extraction, acceleration of tasks with dispatching time lagged, and self-assessment.

The technical proposal in the invention is the memory dispatching method applied to real-time data ETL system. The main ETL dispatching program executes one task according to preset sequence. In the execution, some key information are memorized by dispatching engine, such as lscycle (latest successful data cycle), curcycle (current processing data cycle), and endcycle (processing end data cycle), etc., and transferred to the called program. After the execution of the called program, the dispatching engine records and keeps the updated dispatching information. In the data re-extraction, memory dispatching method is adopted for the automatic re-extraction of some tasks and cycles therein.

Classification of ETL data
  ETL data are classified into fixed cycle data and cyclic closed-loop data according to the characteristics of changes:
    Fixed cycle: Static data within the analysis cycle;
    Cyclic closed-loop: The record of the last change within the certain extraction cycle which are variable. The cycle is not fixed and ranges from the execution time of last extraction to the present one.
Memory dispatching method
  If the dispatching flow is Wf1, and the task $B1 \in wf1$, then
    State of Wf1={wstate—state,
      lscycle—latest successful data cycle,
      endcycle—processing end data cycle,
      curcycle—current processing data cycle}
    State of B1={bstate—state,
      succnum—time of successful running,
      succtotal—total hours of successful running,
      succavg—average hours of successful running}
  Cyclic closed-loop memory dispatching method:
    If the initial extraction time of one cyclic closed-loop data set (A, A) is $\Phi$, and data are extracted once in every T0 minute(s), then the extraction time set of the data set A $=[\Phi, \Phi 1)+[\Phi 1, \Phi 2)+[(\Phi 2, \Phi 3)+ \ldots +[\Phi n-1, \Phi n)+ \ldots$
    Where, "$[(\Phi n$" indicates $\geq \Phi n$, "$\Phi n+1)$" indicates $< \Phi n+1$.
    $\Phi n$ indicates the current time point when data set A is extracted in every T0 minute(s), which generally is equal to $\Phi + T0*n$ (n starts from 1, and indicates the T0 minutes n after $\Phi$);
    Therefore, for some [$\Phi n, \Phi n+1$) in the cyclic closed-loop:
      lscycle=[$\Phi n-2, \Phi n-1$)
      curcycle=[$\Phi n-1, \Phi n$)
      endcycle=[$\Phi n-1, \Phi n$)
    The several key information is memorized by the dispatching engine, and never need to be processed by the called program, and instead, the dispatching engine automatically informs the called program to execute the tasks of the following time sequence: [$\Phi n-1, \Phi n$)
    Meanwhile, wstate, bstate, succnum, succtotal, succavg are also memorized by the dispatching engine.
  Fixed-cycle memory dispatching
    For fixed-cycle data ETL dispatching, if the initial extraction cycle of data set (B, B) is $\Pi$, and data are extracted once every T1 day(s), the extraction cycle set of the data set B=$\Pi 1+\Pi 2+\Pi 3+ \ldots +\Pi n-1+\Pi n+ \ldots$ Where, $\Pi n$ is equal to $\Pi+n$ (n starts from 1, and indicates n days after $\Pi$); therefore, for some $\Pi n$ within fixed cycle:

lscycle=$\Pi n-1$
curcycle=$\Pi n$
endcycle=$\Pi k$

The several key information is memorized by the dispatching engine, and never need to be processed by the called program, and instead, the dispatching engine automatically informs the called program to execute the tasks of the following time sequence $\Pi n, \Pi n+1 \ldots \Pi k-1, \Pi k$ Meanwhile, wstate, bstate, succnum, succtotal, succavg are also memorized by the dispatching engine. If ETL task is suspended or falsely executed for some reason, and lags behind the preset plan; and when the task is restored to the normal operation, it's available to automatically accelerate the ETL task according to the characteristics of time cycle.

(1) Data are classified into fixed-cycle extraction mode and cyclic closed-loop extraction mode, which are applied to the extraction of static data and variable data respectively. Fixed-cycle extraction mode supports static data, and cyclic closed-loop extraction mode supports variable data.

(2) As for the work steps of the cyclic closed-loop extraction mode, the dispatching engine (namely program) transfers the last successfully executed time point and the current executed time point to the called executive program of cyclic closed-loop extraction, and records the dispatching information executed in the cyclic closed-loop extraction task.

(3) As for the fixed-cycle extraction mode, the dispatching engine automatically records the initial data cycle and end data cycle to be executed, then executes the called executive program of fixed cycle extraction one by one according to time cycle, and records the dispatching information executed in the task.

In the executive program of cyclic closed-loop extraction mode, carry out real-time data ETL according to timestamp.

It simplifies the called executive program of cyclic closed-loop extraction and the tasks of the called executive program of fixed cycle extraction, which makes the called program focus on its own business logic through memory state, also plentiful time is saved for development in the real-time data ETL field, and greatly enhances the efficiency of project implementation.

In the data re-extraction, memory dispatching method is adopted for the automatic re-extraction of some tasks and some cycles therein. If ETL task is suspended or falsely executed for some reason, and lags behind the preset plan; and when the task is restored to the normal operation, it's available to automatically accelerate the ETL task.

Each task could carry out self-assessment on its own operation. The main ETL dispatching engine (main program) executes one task according to preset sequence (supports the tasks distributed on different main frames). In the execution, key information memorized by dispatching engine, such as lscycle (latest successful data cycle), curcycle (current processing data cycle), and endcycle (processing end data cycle), etc., are transferred to the called program; After the execution of the called program, the dispatching engine records and keeps the updated dispatching information. The dispatching engine carries out memory and state-based dispatching according to the characteristics of real-time ETL, so the called program could pay more attentions to its own business logic.

The overall technical proposal is shown in FIG. 1, and the detailed description is listed as followed:

Principle for classification of ETL data

ETL data may be classified into fixed cycle data and cyclic closed-loop data according to the characteristics of changes:

Fixed cycle: Static data within the analysis cycle, such as the flowing interface data, including phone call list. Same data will be obtained if extracting the voice list of the certain day at anytime.

Cyclic closed-loop: The record of the last change within the certain extraction cycle which are variable. The cycle is not fixed and ranges from the execution time of last extraction to the present one. Memory dispatching method If the dispatching flow is Wf1, and the task B1 ∈ wf1, then State of Wf1={wstate—state,
  lscycle—latest successful data cycle,
  endcycle—processing end data cycle,
  curcycle—current processing data cycle}

State of B1={bstate—state,
  succnum—time of successful running,
  succtotal—total hours of successful running,
  succavg—average hours of successful running}

Cyclic closed-loop memory dispatching

If the initial extraction time of some cyclic closed-loop data set (A, A) is $\Phi$, and data are extracted once in every T0 minute(s), then the extraction time set of the data set A=[$\Phi$, $\Phi 1$)+[$\Phi 1$, $\Phi 2$)+[$\Phi 2$, $\Phi 3$)+ . . . +[$\Phi n-1$, $\Phi n$)+ . . .

Where, "[$\Phi n$" indicates $\geq \Phi n$, "$\Phi n+1$)" indicates <$\Phi n+1$.

$\Phi n$ indicates the current time point when data set A is extracted every T0 minute(s), which generally is equal to $\Phi+T0*n$ (n starts from 1, and indicates the T0 minutes n after $\Phi$); however, if the data extraction lasts for over T0 minute(s) sometimes for some very special reasons (such as abnormal network), the $\Phi n$ won't be equal to $\Phi+T0*n$, and will even possibly be laggard by many T0 minute(s), and here, there is a problem of accelerating the laggard dispatching time. For example, T0=5 minutes.

Therefore, for some [$\Phi n$, $\Phi n+1$) in the cyclic closed-loop:

lscycle=[$\Phi n-2$, $\Phi n-1$)
curcycle=[$\Phi n-1$, $\Phi n$)
endcycle=[$\Phi n-1$, $\Phi n$)

The several key information is memorized by the dispatching engine, and never need to be processed by the called program, and instead, the dispatching engine automatically informs the called program to execute the tasks of the following time sequence: [$\Phi n-1$, $\Phi n$)

Meanwhile, wstate, bstate, succnum, succtotal, succavg are also memorized by the dispatching engine.

Fixed-cycle memory dispatching

For fixed-cycle data ETL dispatching, if the initial extraction cycle of data set (B, B) is $\Pi$, and data are extracted once every T1 day(s) (such as 1 day), the extraction cycle set of the data set B=$\Pi 1+\Pi 2+\Pi 3+ \ldots +\Pi n-1+\Pi n+ \ldots$ Where, $\Pi n$ is equal to $\Pi+n$ (n starts from 1, and indicates n day since $\Pi$). Therefore, for some $\Pi n$ in a fixed cycle:

lscycle=$\Pi n-1$
curcycle=$\Pi n$
endcycle=$\Pi k$ (if there is accelerating of the task after dispatching time lagged for network reasons, etc., $k \geq n$)

The several key information is memorized by the dispatching engine, and never need to be processed by the called program, and instead, the dispatching engine automatically informs the called program to execute the tasks of the following time sequence:
Пn, Пn+1 ... Пk−1, Пk Meanwhile, wstate, bstate, succnum, succtotal and succavg are also memorized by the dispatching engine.

Beneficial effects of the invention: According to the technical proposal of the memory dispatching method, the following effects of the memory dispatching will be shown:

Solving the problem of cyclic closed-loop extraction: It could solve the problem caused by the cyclic closed-loop extraction according to timestamp in the ETL system.

Solving the problem of data re-extraction: It could effectively solve the problem of automatic data re-extraction.

Solving the problem of accelerating of tasks after dispatching time lagged: If ETL task is suspended or falsely executed for some reason, and lags behind the preset plan; when the task is restored to the normal operation, it's available to automatically accelerate the ETL task according to the characteristics of time cycle.

Solving the problem of self-assessment: It is available to assess the self-operation of tasks.

BRIEF DESCRIPTION OF THE DRAWINGS

FIG. 1 is the chart of the memory dispatching method in this invention.

DETAIL DESCRIPTION OF THE INVENTION

As shown in FIG. 1, the main ETL dispatching engine (main program) executes one task according to preset sequence (supports the tasks distributed on different main frames). In the execution, key information memorized by dispatching engine, such as lscycle, curcycle, and endcycle, etc., are transferred to the called program. After the execution of the called program, the dispatching engine records and keeps the updated dispatching information. The dispatching engine carries out memory and state-based dispatching according to the characteristics of real-time ETL, so the called program could pay more attention to its own business logic.

Actual Case One: One domestic telecom company executed ETL extraction, which covered users' information and phone call data. of which, users' information were extracted once in every 15 min, which belonged to the cyclic closed-loop extraction mode; while phone call data were extracted once daily which belonged to the fixed-cycle extraction mode.

Arrange the dispatching engine firstly and allocate the dispatching flow and tasks;

The dispatching engine executes the following tasks according to the arrangement cycle:

ETL dispatching engine transfers lscycle, curcycle, and endcycle to the called program for processing of business logic every 15 min, while the dispatching engine records related dispatching information.

ETL dispatching engine transfers lscycle, curcycle, and endcycle to the called program for processing of business logic every other day, while the dispatching engine records related dispatching information.

What is claimed is:

1. An improved data ETL (Extraction-Transformation-Loading) dispatching method comprising:
   a. extracting data from distributed and heterogeneous data sources;
   b. placing the extracted data into an interim intermediate layer for cleaning, transformation and integration; and
   c. loading the extracted data to a data warehouse or data mart used for online analysis; wherein,
      in the execution of the steps a, b and c, key dispatching information lscycle (latest successful data cycle), curcycle (current processing data cycle), and endcycle (processing end data cycle) are memorized and transferred to called programs, and after the executions of the called programs, a dispatching engine records and keeps updated key dispatching information;
      in the re-extraction of the steps a, b and c, the updated key dispatching information lscycle (latest successful data cycle), curcycle (current processing data cycle), and endcycle (processing end data cycle) are adopted for automatic re-extractions of some tasks and some cycles therein; wherein,
      the improved data ETL dispatching method further comprises:
      a fixed cycle data ETL dispatching method wherein a fixed cycle data represents static data within an analysis cycle; and
      a cyclic closed-loop data ETL dispatching method wherein cyclic closed-loop data represents the recordings of the last change within the certain extraction cycle which are variable, where the cycle is not fixed and ranges from the execution time of last extraction to present one; wherein
      in the improved data ETL dispatching method:
      if a dispatching flow is represented by Wf1, and a task B1 ∈Wf1, then
      State of Wf1={wstate—state,
      lscycle—latest successful data cycle,
      endcycle—processing end data cycle,
      curcycle—current processing data cycle}
      State of B1={bstate—state,
      succnum—time of successful running,
      succtotal—total hours of successful running,
      succavg—average hours of successful running}; and
      the improved data ETL dispatching method further comprises:
      determining if a task has been suspended or falsely executed for some reason, and lags behind a preset plan,
      restoring the task to normal operation, and
      automatically accelerating the task according to the characteristics of the time cycle.

2. The improved data ETL dispatching method of claim 1, wherein in data re-extraction, the improved data ETL dispatching method is adopted for automatic re-extraction of some tasks and some cycles therein.

3. The improved data ETL dispatching method of claim 1, wherein each task can conduct self-assessment on its own operation.

4. The improved data ETL dispatching method of claim 1, wherein the cyclic closed-loop data ETL dispatching method including:
   an initial extraction time of a cyclic closed-loop data set (A, A) is $\Phi$, and data is extracted once in every T0 minute(s), then an extraction time set of the data set A=[$\Phi$, $\Phi$1)+ [$\Phi$1, $\Phi$2)+[$\Phi$2, $\Phi$3)+ ... +[$\Phi$n−1, $\Phi$n)+ ...

Where, "[Φn" indicates $\geq$Φn, "Φn+1)" indicates <Φn+1,
Φn indicates a current time point when data set A is extracted in every T0 minutes, which generally is equal to Φ+T0*n (n starts from 1, and indicates the T0 minutes n after Φ);
therefore, for [Φn, Φn+1) in the cyclic closed-loop:
lscycle=[Φn−2, Φn−1)
curcycle=[Φn−1, Φn)
endcycle=[Φn−1, Φn)
key information is memorized by the dispatching engine, and never needs to be processed by the called program, and instead, the dispatching engine automatically informs the called program to execute the tasks of the following time sequence:
[Φn−1, Φn)
meanwhile, wstate, bstate, succnum, succtotal, succavg are also memorized by the dispatching engine.

5. The improved data ETL dispatching method of claim 1, wherein the fixed cycle data ETL dispatching method including:
for a fixed-cycle data ETL dispatching, if an initial extraction cycle of data set (B, B) is Π, and data is extracted once every T1 day(s), the extraction cycle set of the data set B=Π1+Π2+Π3+ . . . +Πn−1+Πn+ . . .
where, Π is equal to Π+n (n starts from 1, and indicates n day after Π); therefore, for Πn within fixed cycle:
lscycle=Πn−1
curcycle =Πn
endcycle =Πk
the key information is memorized by the dispatching engine, and never need to be processed by the called programs, and instead, the dispatching engine automatically informs the called programs to execute the tasks of the following time sequence
Πn, Πn+1 . . . Πk−1, Πk
meanwhile, wstate, bstate, succnum, succtotal, succavg are also memorized by the dispatching engine.

\* \* \* \* \*